(12) United States Patent
Koike

(10) Patent No.: US 9,100,637 B2
(45) Date of Patent: Aug. 4, 2015

(54) IMAGE PROCESSING APPARATUS AND CONTROL METHOD THEREOF

(75) Inventor: Toru Koike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 13/095,072

(22) Filed: Apr. 27, 2011

(65) Prior Publication Data

US 2011/0267424 A1   Nov. 3, 2011

(30) Foreign Application Priority Data

Apr. 30, 2010   (JP) .................................. 2010-105134
Jan. 18, 2011   (JP) .................................. 2011-007823

(51) Int. Cl.
  *H04N 13/00*   (2006.01)
  *H04N 13/04*   (2006.01)

(52) U.S. Cl.
  CPC ....... *H04N 13/0029* (2013.01); *H04N 13/0497* (2013.01); *H04N 13/0438* (2013.01)

(58) Field of Classification Search
  CPC .......... H04N 13/0029; H04N 13/0497; H04N 13/0438
  USPC ...................... 348/42, 43, 47, 51; 375/240.12
  See application file for complete search history.

(56) References Cited

U.S. PATENT DOCUMENTS

| | | | |
|---|---|---|---|
| 6,614,936 B1 * | 9/2003 | Wu et al. ........................ | 382/238 |
| 7,411,611 B2 * | 8/2008 | Bracke ........................ | 348/218.1 |
| 2002/0150158 A1 * | 10/2002 | Wu et al. ................... | 375/240.12 |
| 2008/0143964 A1 * | 6/2008 | Cowan et al. ..................... | 353/7 |
| 2008/0291326 A1 * | 11/2008 | Shishido et al. .............. | 348/555 |
| 2010/0033555 A1 * | 2/2010 | Nagase et al. .................. | 348/43 |
| 2010/0259653 A1 * | 10/2010 | Kimura ......................... | 348/252 |

(Continued)

FOREIGN PATENT DOCUMENTS

| | | |
|---|---|---|
| JP | 2001-320734 | 11/2001 |
| JP | 2002-351382 | 12/2002 |

(Continued)

OTHER PUBLICATIONS

The above references were cited in a Jan. 29, 2013 Japanese Office Action, a copy of which is enclosed without an English Translation, that issued in Japanese Patent Application No. 2011-007823.

(Continued)

*Primary Examiner* — Christopher S Kelley
*Assistant Examiner* — Zhihan Zhou
(74) *Attorney, Agent, or Firm* — Cowan, Liebowitz & Latman, P.C.

(57) ABSTRACT

An image processing apparatus includes: a converting unit that converts a frame rate of a stereoscopic video into an N-fold frame rate of the frame rate; and an outputting unit that converts images of respective frames of the stereoscopic video subjected to frame rate conversion into a high frequency image or a low frequency image and outputs the converted images, wherein the converting unit outputs an image for left eye and an image for right eye N times each at the converted frame rate, and the outputting unit converts at least one set of consecutive images constituted by a frame of the image for right eye and a frame of the image for left eye, from among 2×N frames output by the converting unit, into the high frequency image, converts an image of a remaining frame into the low frequency image, and then outputs the converted images.

12 Claims, 8 Drawing Sheets

(56) References Cited

U.S. PATENT DOCUMENTS

| | | | |
|---|---|---|---|
| 2010/0260268 A1* | 10/2010 | Cowan et al. | 375/240.25 |
| 2010/0302214 A1* | 12/2010 | Kim et al. | 345/204 |
| 2010/0329457 A1* | 12/2010 | Miller et al. | 380/200 |
| 2011/0058016 A1* | 3/2011 | Hulyalkar et al. | 348/42 |
| 2012/0033041 A1* | 2/2012 | Nagaraj et al. | 348/43 |
| 2012/0268570 A1* | 10/2012 | Trumbull | 348/47 |

FOREIGN PATENT DOCUMENTS

| | | |
|---|---|---|
| JP | 2007-061105 A | 3/2007 |
| JP | 2009-025436 A | 2/2009 |
| WO | 2007-052441 A1 | 5/2007 |
| WO | WO 2010011556 A1 * | 1/2010 |
| WO | 2010-021180 A1 | 2/2010 |
| WO | WO 2010126227 A2 * | 11/2010 |

OTHER PUBLICATIONS

The above references were cited in a Nov. 20, 2012 Japanese Office Action, a copy of which is enclosed without an English Translation, that issued in Japanese Patent Application No. 2011-007823.

* cited by examiner

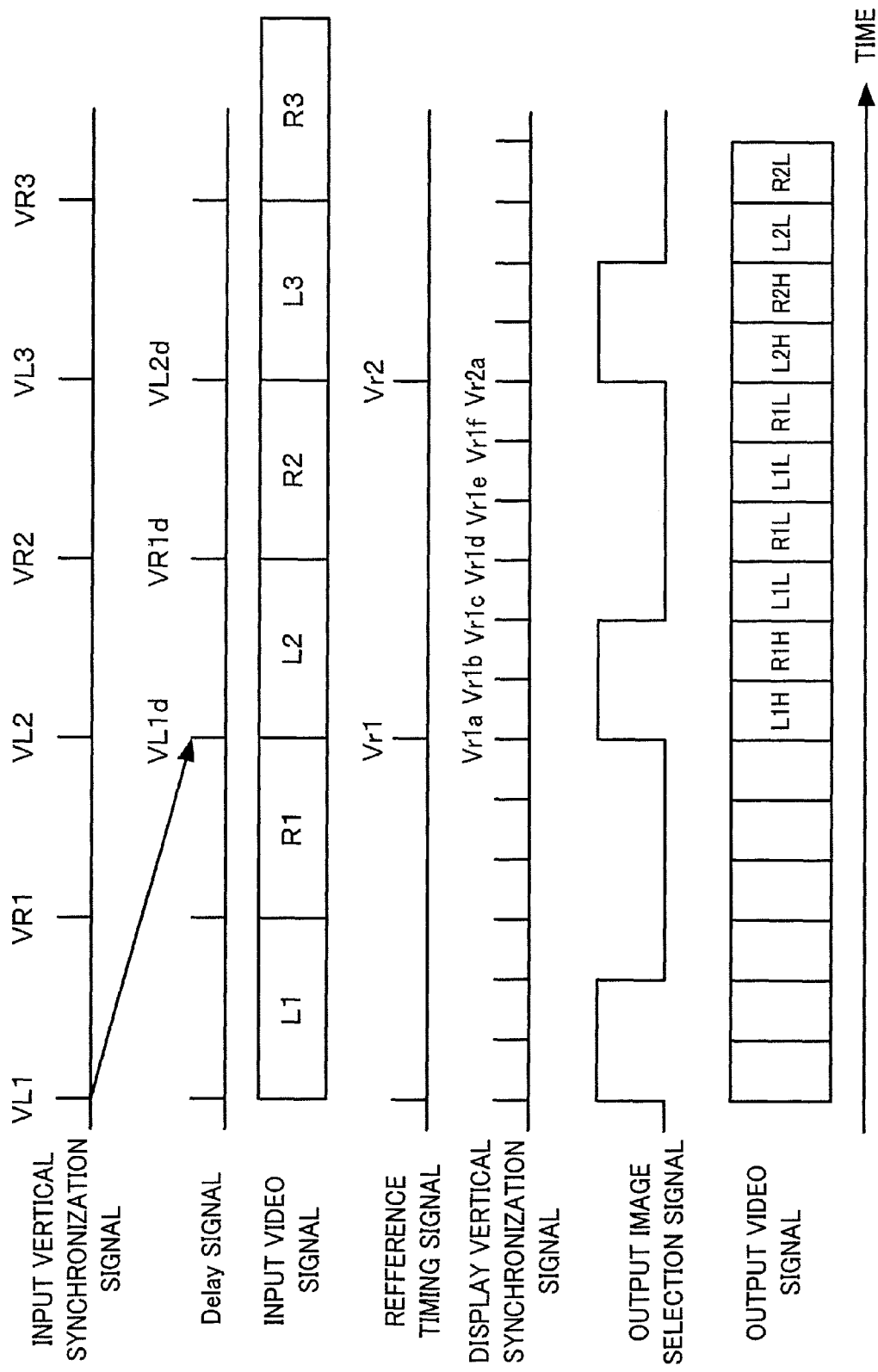

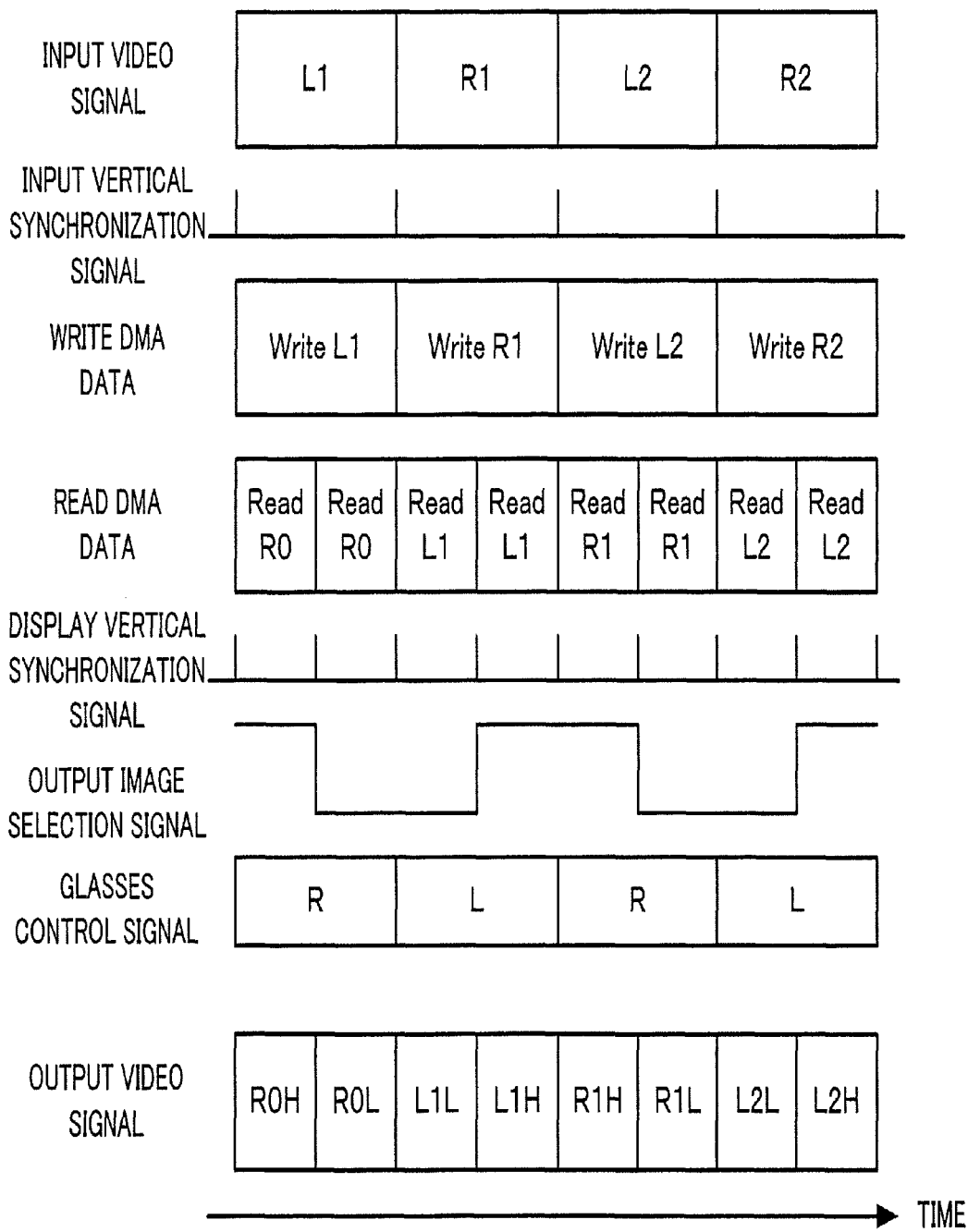

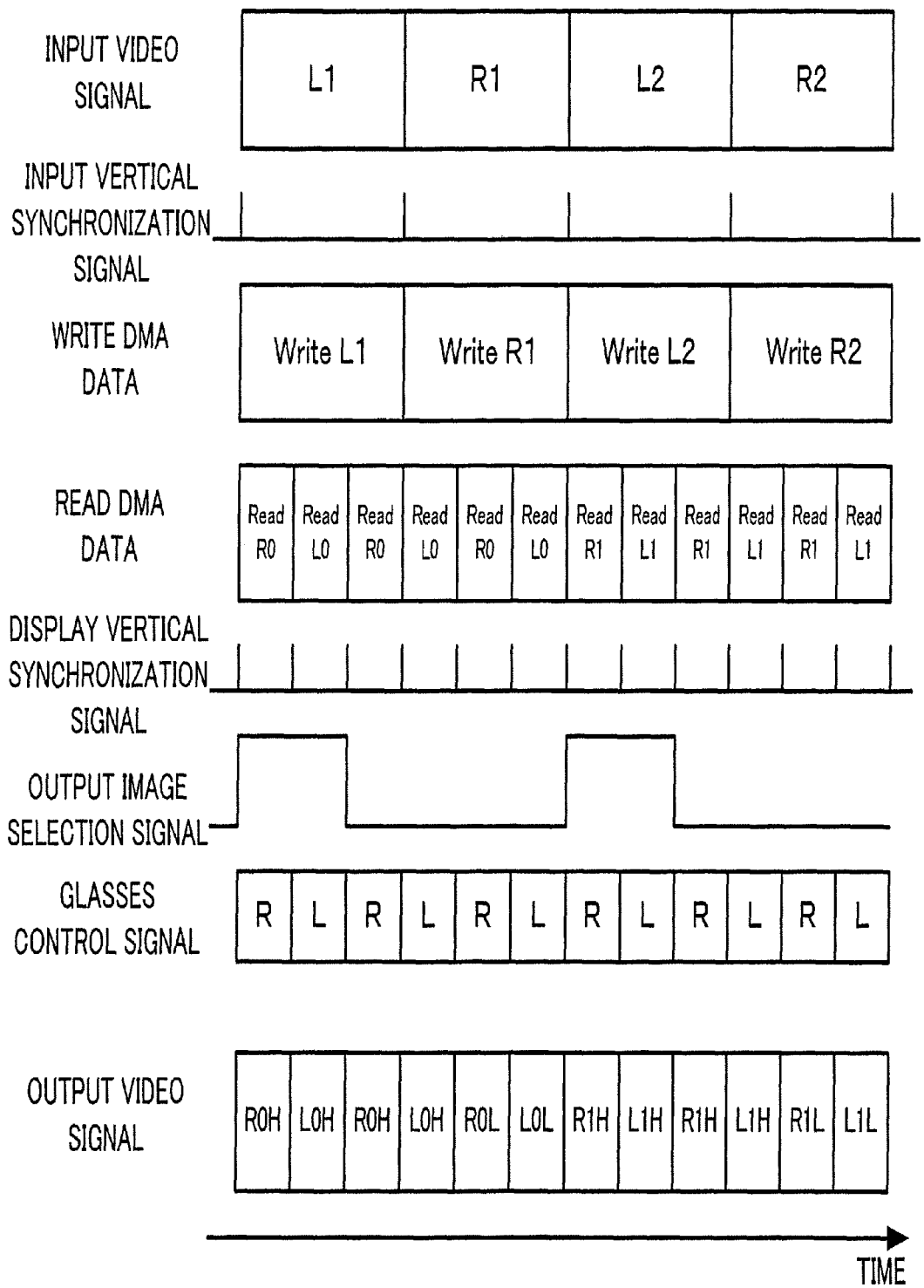

IMAGE PROCESSING APPARATUS AND CONTROL METHOD THEREOF

BACKGROUND OF THE INVENTION

1. Field of the Invention

The present invention relates to an image processing apparatus and a control method thereof.

2. Description of the Related Art

In a system proposed in the related art, an image for right eye and an image for left eye having a disparity are captured at an identical timing using a twin-lens camera and displayed alternately such that when the image for right eye is viewed by a right eye and the image for left eye is viewed by a left eye using shutter glasses, the images are viewed stereoscopically (Japanese Patent Application Publication No. 2001-320734).

Further, a drive distribution system has been proposed as a technique for improving motion blur in a moving image (Japanese Patent Application Publication No. 2002-351382). In the technique disclosed in Japanese Patent Application Publication No. 2002-351382, a frame rate of an original video is doubled. An image corresponding to one of two consecutive frames is then passed through a high pass filter to generate a high frequency image including a large number of high frequency components. Meanwhile, an image corresponding to the other frame is passed through a low pass filter to generate a low frequency image including a large number of low frequency components. The high frequency image and the low frequency image are then displayed alternately. By doubling the frame rate of the original video, displaying high frequency components in relation to one of the two consecutive frames, and displaying low frequency components in relation to the other frame in this manner, a double image can be prevented and flickering can be reduced.

However, Japanese Patent Application Publication No. 2001-320734 does not mention applying the drive distribution system described above to a stereoscopic system, and does not describe a technique for reducing motion blur occurring when an image for right eye and an image for left eye constituting a stereoscopic video are viewed stereoscopically. Further, Japanese Patent Application Publication No. 2002-351382 makes no mention of a case in which the original video is a stereoscopic video.

SUMMARY OF THE INVENTION

The present invention is provides a technique for reducing motion blur occurring when an image for right eye and an image for left eye constituting a stereoscopic video are viewed stereoscopically.

A first aspect of the present invention is an image processing apparatus comprising:

a converting unit that converts a frame rate of a stereoscopic video constituted by a frame of an image for right eye and a frame of an image for left eye to an N-fold (where N is an integer larger than 1) frame rate of the frame rate; and an outputting unit that converts images of respective frames of the stereoscopic video subjected to frame rate conversion into a high frequency image obtained by cutting or reducing components in a predetermined low frequency band or a low frequency image obtained by cutting or reducing components in a predetermined high frequency band, and outputs the converted images, wherein the converting unit outputs an image for left eye and an image for right eye forming a pair in the stereoscopic video N times each at the converted frame rate, and the outputting unit converts at least one set of consecutive images constituted by the frame of the image for right eye and the frame of the image for left eye, from among 2×N frames constituted by frames of respective pairs of the image for left eye and the image for right eye output by the converting unit, into the high frequency image, converts an image of a remaining frame into the low frequency image, and then outputs the converted images.

A second aspect of the present invention is a control method for an image processing apparatus, comprising:

a conversion step for converting a frame rate of a stereoscopic video constituted by a frame of an image for right eye and a frame of an image for left eye into an N-fold (where N is an integer larger than 1) frame rate of the frame rate; and an output step for converting images of respective frames of the stereoscopic video subjected to frame rate conversion into a high frequency image obtained by cutting or reducing components in a predetermined low frequency band or a low frequency image obtained by cutting or reducing components in a predetermined high frequency band, and outputting the converted images, wherein, in the conversion step, an image for left eye and an image for right eye forming a pair in the stereoscopic video are output N times each at the converted frame rate, and in the output step, at least one set of consecutive images constituted by the frame of the image for right eye and the frame of the image for left eye, from among 2×N frames constituted by frames of respective pairs of the image for left eye and the image for right eye output in the conversion step, is converted into the high frequency image, an image of a remaining frame is converted into the low frequency image, and the converted images are output.

According to the present invention, motion blur occurring when an image for right eye and an image for left eye constituting a stereoscopic video are viewed stereoscopically can be reduced.

Further features of the present invention will become apparent from the following description of exemplary embodiments with reference to the attached drawings.

BRIEF DESCRIPTION OF THE DRAWINGS

FIG. 6 is a view showing an example of a control method for an output image selection unit according to the second embodiment;

FIG. 8 is a view showing examples of various types of information and output timings thereof according to the second embodiment;

FIG. 7 is a view showing examples of various types of information and output timings thereof according to a third embodiment;

DESCRIPTION OF THE EMBODIMENTS

First Embodiment

An image processing apparatus and a control method thereof according to a first embodiment of the present invention will be described below.

Figure 1:
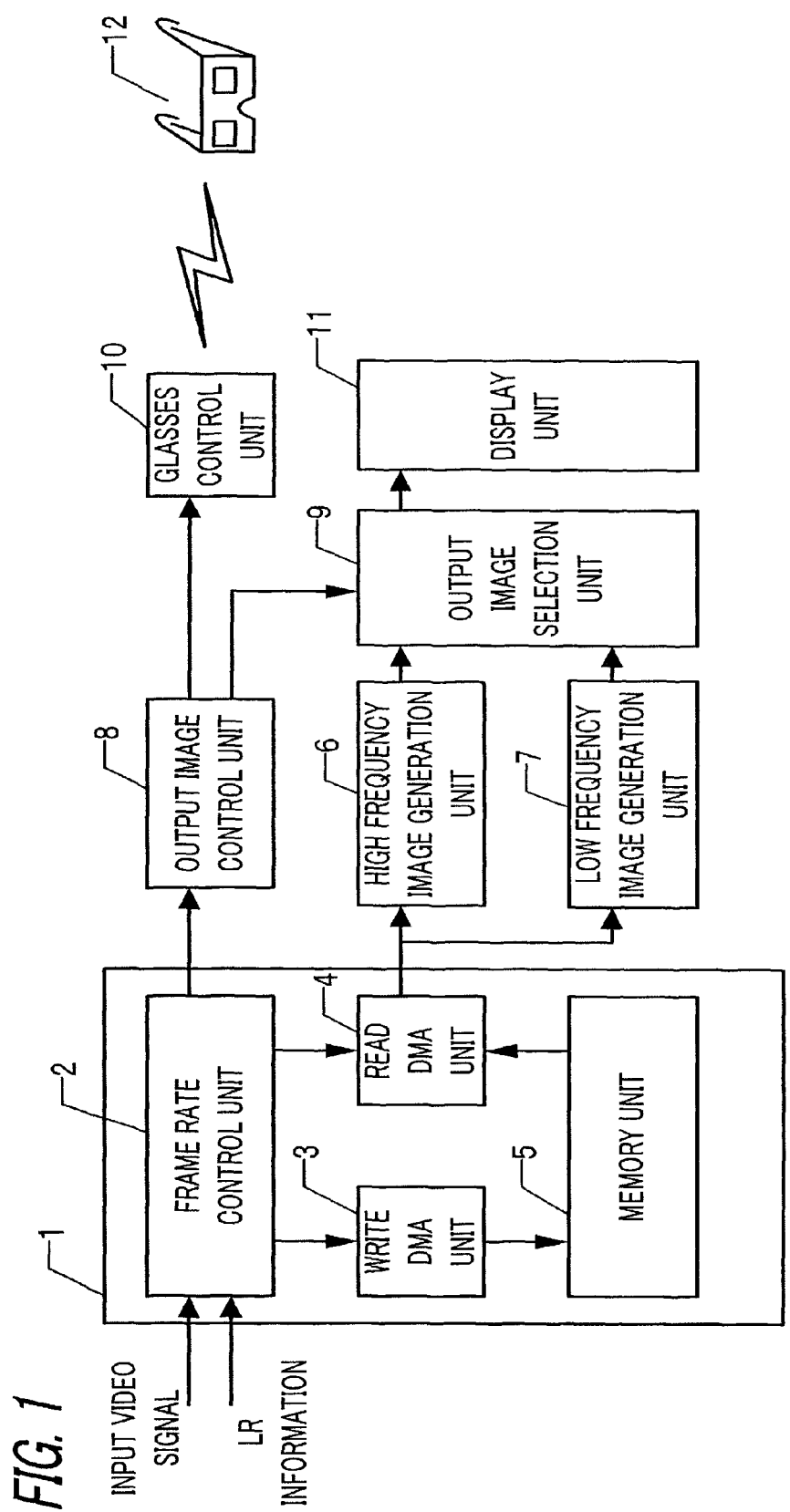
FIG. 1 is a block diagram showing a functional constitution of an image processing apparatus according to an embodiment.

FIG. 1 is a block diagram showing a functional constitution of the image processing apparatus according to this embodiment.

A frame rate conversion unit 1 performs processing to increase a frame rate of an input video signal. More specifically, the frame rate of a stereoscopic video constituted by a frame of an image for right eye and a frame of an image for left eye is converted to an N-fold (where N is an integer larger than 1) frame rate of the original frame rate. In this embodiment, N=2. The input video signal is a video signal in which frames of images for right eye and frames of images for left eye are arranged alternately, and is input from a content reproduction unit, not shown in the drawings. As well as the input video signal, LR information is input into the frame rate conversion unit 1. The LR information is information indicating whether an image of an input frame is an image for right eye or an image for left eye, and this information changes in synchronization with a vertical synchronization signal of the input video signal. For example, information indicating L and information indicating R are attached as the LR information to the image for left eye and the image for right eye, respectively.

As shown in FIG. 1, the frame rate conversion unit 1 includes a frame rate control unit 2, a write DMA unit 3, a read DMA unit 4, and a memory unit 5.

The input video signal and the LR information are input into the frame rate control unit 2 in frame units. The frame rate control unit 2 performs processing (frame rate conversion) for increasing the frame rate of the input video signal by controlling the write DMA unit 3 and the read DMA unit 4.

The write DMA unit 3 reads an image input into the frame rate control unit 2 and the LR information thereof, and records the read image and LR information in the memory unit 5.

The memory unit 5 is a storage device such as a magnetic disk, a volatile memory, or a non-volatile memory. The read DMA unit 4 reads and outputs images recorded in the memory unit 5 at the frame rate determined by the frame rate control unit 2.

The read DMA unit 4 reads and outputs an image for left eye and an image for right eye forming a pair of images in the stereoscopic video N times each at the converted frame rate. In this embodiment, processing for reading and outputting the image for left eye and the image for right eye alternately at the converted frame rate is performed N times. More specifically, in this embodiment, N=2, and therefore the read DMA unit 4 performs processing for reading and outputting the image for left eye and the image for right eye alternately at twice the frame rate of the input video signal twice. The image for left eye and the image for right eye forming a pair of images in the stereoscopic video are images captured at an identical timing, for example. Note, however, that the present invention is not limited thereto as long as the images can be viewed stereoscopically when the image for right eye is viewed by a right eye and the image for left eye is viewed by a left eye.

A high frequency image generation unit 6, a low frequency image generation unit 7, an output image control unit 8, and an output image selection unit 9 convert images of respective frames of the stereoscopic video subjected to frame rate conversion into a high frequency image or a low frequency image, and output the resulting images. Note that the high frequency image is an image on which high frequency components are emphasized, whereas the low frequency image is an image on which low frequency components are emphasized.

The high frequency image generation unit 6 generates a high frequency image by performing filter processing for obtaining spatial high frequency components from the images of the respective frames subjected to frame rate conversion and output by the frame rate conversion unit 1.

The low frequency image generation unit 7 generates a low frequency image by performing filter processing for obtaining spatial low frequency components from the images of the respective frames subjected to frame rate conversion and output by the frame rate conversion unit 1.

In other words, in this embodiment, the high frequency image and the low frequency image are generated from the respective frames of the frame rate-converted stereoscopic video.

The high frequency image generation unit 6, for example, executes filter processing having a high pass characteristic for cutting or reducing components in a predetermined low frequency band. The low frequency image generation unit 7, for example, executes filter processing having a low pass characteristic for cutting or reducing components in a predetermined high frequency band.

The output image control unit 8 controls an image (an output image) output to a display unit 11 and opening/closing of shutters of a pair of stereoscopic glasses 12, to be described below. More specifically, on the basis of a post-frame rate conversion vertical synchronization signal, the LR information, a delay of the frame rate conversion unit 1, and so on, the output image control unit 8 generates an output image selection signal representing the image to be output to the display unit 11 and an opening/closing timing signal representing an opening/closing timing of the shutters. The delay of the frame rate conversion unit 1 is a delay between input and output during frame rate conversion.

The output image selection unit 9 selects and outputs one of the high frequency image and the low frequency image for each frame. More specifically, output of the high frequency image and the low frequency image is switched in accordance with the output image selection signal generated by the output image control unit 8.

A glasses control unit 10 outputs a signal for controlling opening/closing of the shutters of the stereoscopic glasses 12 to the stereoscopic glasses 12 in accordance with the opening/closing timing signal generated by the output image control unit 8. The opening/closing timing signal may be a signal representing the opening/closing timing of the shutters or an identical signal to the output image selection signal. In a case where the opening/closing timing signal is a signal representing the opening/closing timing of the shutters, the glasses control unit 10 may output the signal as is. In a case where the opening/closing timing signal is an identical signal to the output image selection signal, on the other hand, the glasses control unit 10 should output a signal for opening a right eye shutter and closing a left eye shutter when the opening/closing timing signal indicates the image for right eye, and when the opening/closing timing signal indicates the image for left eye, the glasses control unit 10 should output a signal for opening the left eye shutter and closing the right eye shutter.

The display unit 11 displays the image output by the output image selection unit 9. A viewer views a video displayed on the display unit 11 while wearing the stereoscopic glasses 12 and can therefore view a stereoscopic video. Note that the display unit 11 may be a separate apparatus to the image processing apparatus.

The stereoscopic glasses 12 include shutters for viewing images for right eye with the right eye and images for left eye with the left eye, and a shutter control unit for controlling the shutters.

In this embodiment, respective display timings of the image for right eye and the image for left eye can be brought closer together by increasing the frame rate of the input video signal. As a result, motion blur occurring when a pair of images constituting a stereoscopic video are viewed stereoscopically can be reduced.

However, when an identical image is output N times and the frame rate of the input video signal is increased N-fold, a double image is generated between the images for right eye and between the images for left eye. Hence, in this embodiment, control is performed such that of 2×N consecutive frames within a stereoscopic video subjected to frame rate conversion, images of two (a set of) consecutive frames constituted by a frame of an image for right eye and a frame of an image for left eye are converted into high frequency images and output to the display unit 11. Further, control is performed such that remaining frame images of the 2×N frames are converted into low frequency images and output to the display unit 11. By performing this control, double image generation can be suppressed.

Figure 2:
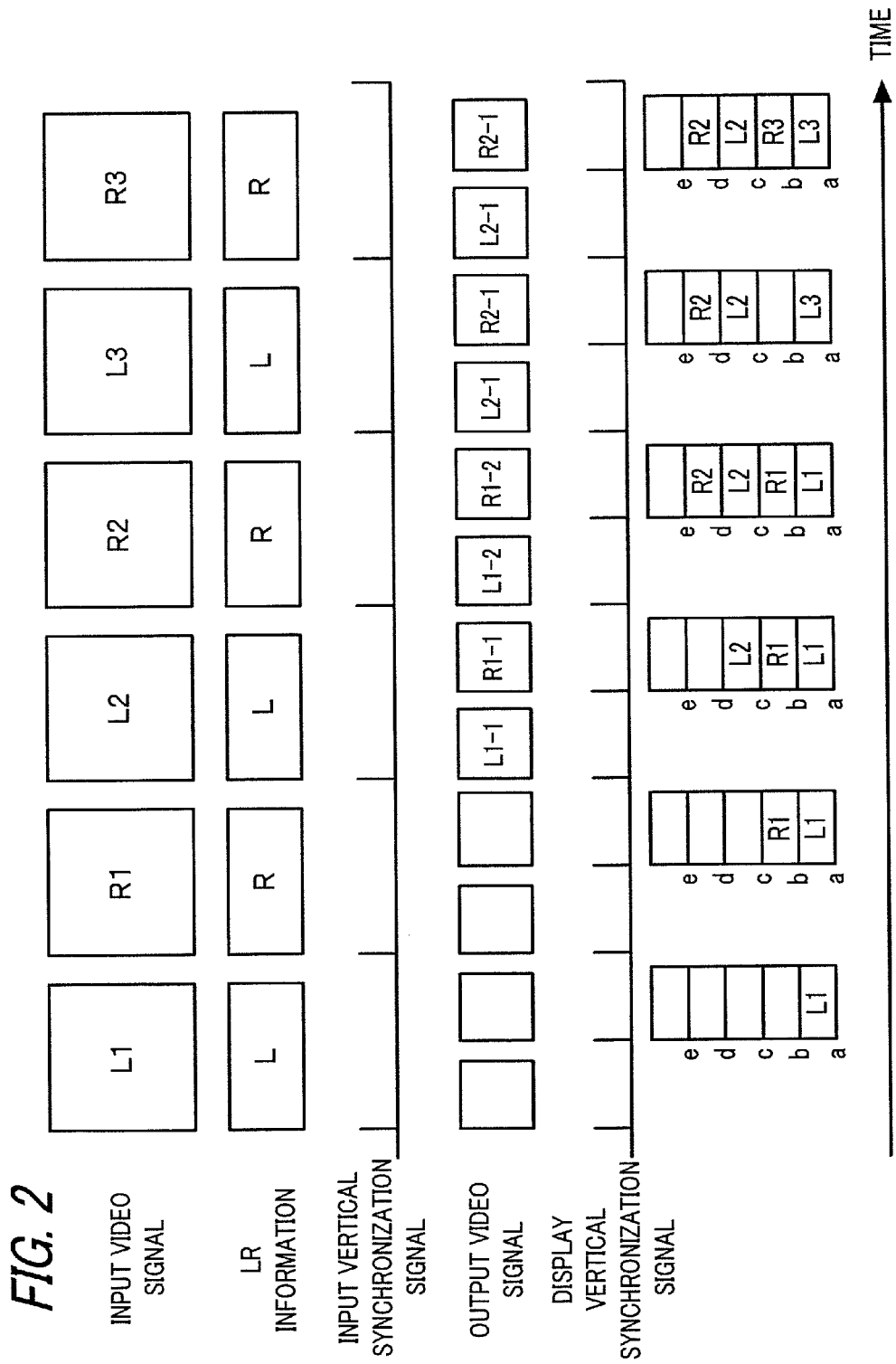
FIG. 2 is a view illustrating frame rate conversion.

FIG. 2 is a view illustrating frame rate conversion.

In the drawing, an input vertical synchronization signal is a vertical synchronization signal of the input video signal. In the first embodiment, a vertical synchronization frequency (frame rate) of the input video signal is set at 120 Hz.

The frame rate control unit 2 writes an image for left eye Ln (where n is a frame number) and an image for right eye Rn of the input video signal to the memory unit 5 using the write DMA unit 3. The write DMA unit 3 records an image for left eye L1, an image for right eye R1, an image for left eye L2, and an image for right eye R2 respectively in an address a, an address b, an address c, and an address d, in that order.

The frame rate control unit 2 then generates a vertical synchronization signal (a display vertical synchronization signal) corresponding to a frame rate that is double the frame rate of the input video signal. The display vertical synchronization signal is a vertical synchronization signal of a video to be displayed (the post-frame rate conversion vertical synchronization signal). In this embodiment, N=2, and therefore the vertical synchronization frequency of the video to be displayed is 240 Hz.

The read DMA unit 4 reads the image for left eye L1 and the image for right eye R1 from the memory unit 5 alternately in alignment with a timing of the display vertical synchronization signal generated by the frame rate control unit 2 (i.e. in synchronization with the display vertical synchronization signal). In the example shown in FIG. 2, image reading begins at an input timing of the image for left eye L2. The read DMA unit 4 performs the processing for outputting the image for left eye L1 and the image for right eye R1 alternately twice. By performing this output processing for each frame pair, the input video signal is subjected to frame rate conversion and output.

Note that in the example shown in FIG. 2, a first output is indicated by an image for left eye Ln-1 and an image for right eye Rn-1, while a second output is indicated by an image for left eye Ln-2 and an image for right eye Rn-2.

Further, a space (addresses) in the memory unit 5 for writing the images and a space of the memory unit 5 that is accessed when reading the images are selected by having the frame rate control unit 2 control the write DMA unit 3 and the read DMA unit 4, for example.

Figure 3:
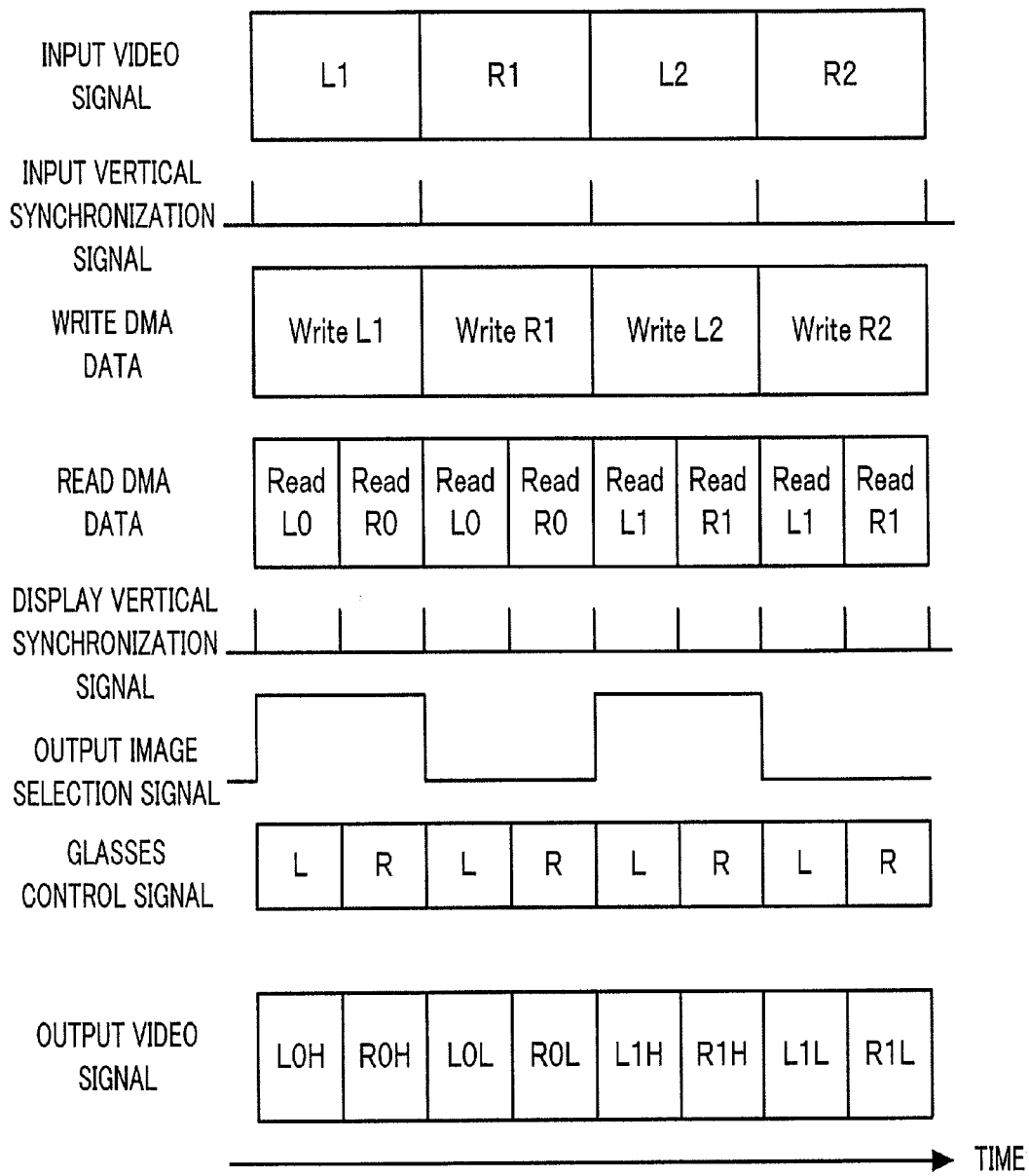
FIG. 3 is a view showing examples of various types of information and output timings thereof according to a first embodiment.

FIG. 3 is a view showing various types of information and output timings thereof according to the first embodiment.

Write DMA data indicate timings at which the write DMA unit 3 writes the image for right eye Rn and the image for left eye Ln to the memory unit 5. WriteLn indicates a timing at which the image for left eye Ln is written to the memory 5, and WriteRn indicates a timing at which the image for right eye Rn is written to the memory unit 5.

Read DMA data indicate timings at which the read DMA unit 4 reads the image for right eye Rn and the image for left eye Ln from the memory unit 5. ReadLn indicates a timing at which the image for left eye Ln is read from the memory unit 5, and ReadRn indicates a timing at which the image for right eye Rn is read from the memory unit 5.

The output image selection signal is generated by the output image control unit 8, and in accordance with this signal, the high frequency image and the low frequency image are output to the display unit 11 alternately. More specifically, when a level of the output image selection signal is High, the high frequency image is selected and output, and when the level is Low, the low frequency image is selected and output. A glasses control signal is output by the glasses control unit 10, and indicates a timing for controlling the shutters of the stereoscopic glasses 12. When the glasses control signal indicates L, the left eye shutter is opened and the right eye shutter is closed. When the glasses control signal indicates R, the left eye shutter is closed and the right eye shutter is opened.

The output image control unit 8 controls the output image selection unit 9 such that an image for left eye and an image for right eye constituted by high frequency images are output within two periods of the display vertical synchronization signal. As a result, a frame of a left eye high frequency image LnH (a high frequency image generated from the image for left eye) and a frame of a right eye high frequency image RnH (a high frequency image generated from the image for right eye) are output consecutively.

Incidentally, a case in which the output image selection unit 9 outputs frame images in order of a left eye high frequency image L1H, a right eye low frequency image R1L, a left eye low frequency image L1L, a right eye high frequency image R1H, a left eye high frequency image L2H . . . may arise. In this case, however, a difference in display timing between the high frequency images (between L1H and R1H) generated from the image for left eye and the image for right eye forming a pair increases. Moreover, the left eye high frequency image L2H is displayed immediately after the right eye high frequency image R1H. As a result, an improvement in movement blur cannot be achieved.

Further, a case in which the output image selection unit 9 outputs frame images in order of the left eye high frequency image L1H, the right eye low frequency image R1L, the left eye high frequency image L1H, the right eye low frequency image R1L, the left eye high frequency image L2H . . . may arise. In this case, however, all of the images for left eye are high frequency images and all of the images for right eye are low frequency images, and therefore a balance between the images seen by the left eye and the images seen by the right eye is disrupted, which is undesirable.

Hence, in this embodiment, control is performed such that of 2×N frames constituted by frames of respective pairs of images for left eye and images for image for right eyes of two (a set of) consecutive frames constituted by a frame of an image for right eye and a frame of an image for left eye are converted into high frequency images and output to the display unit 11. Further, control is performed such that the remaining frame images of the 2×N frames are converted into low frequency images and output to the display unit 11.

Figure 4:
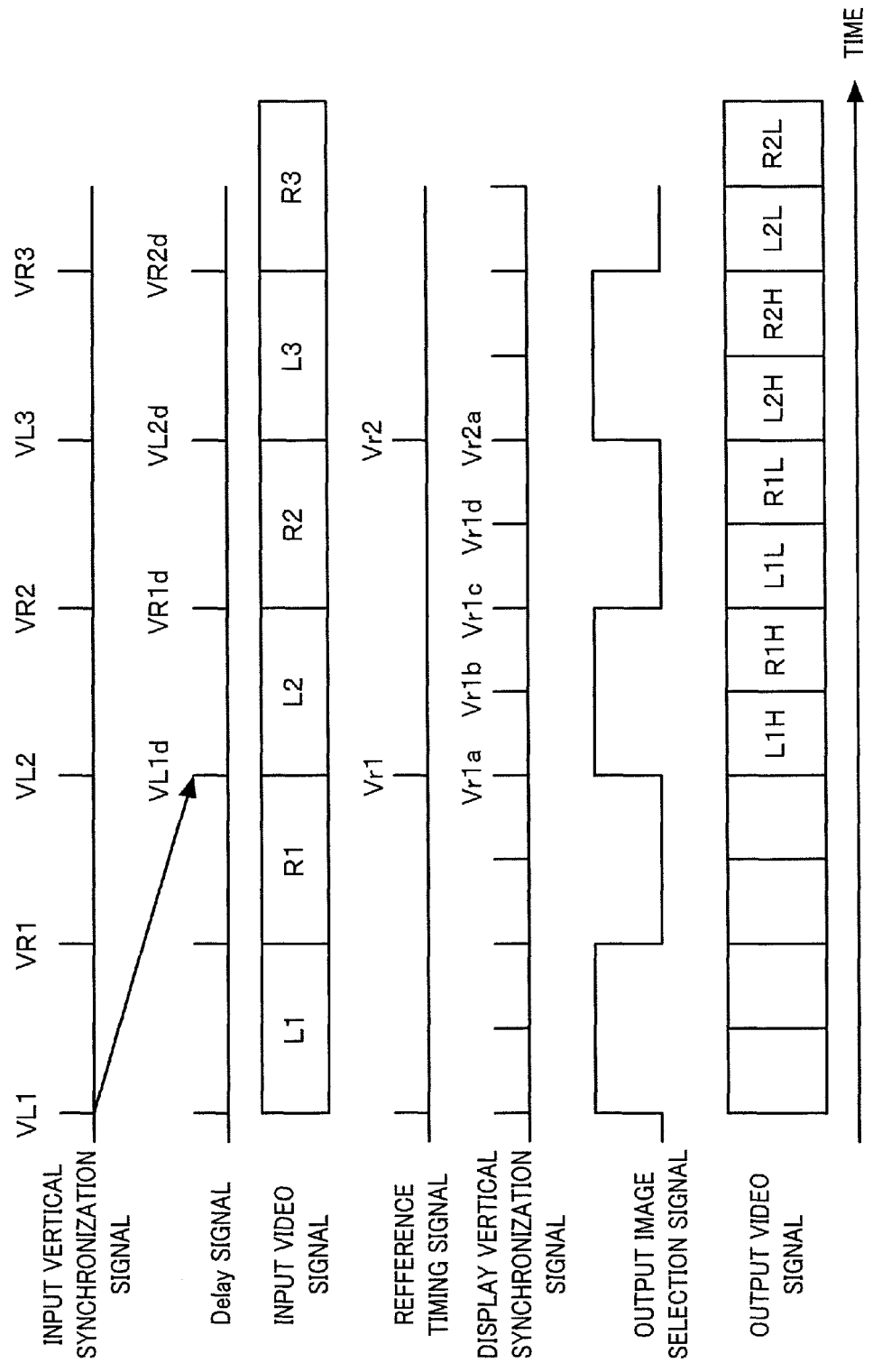
FIG. 4 is a view showing an example of a control method for an output image selection unit according to the first embodiment.

FIG. 4 is a view illustrating a method of controlling the output of the output image selection unit 9 according to the first embodiment.

The frame rate control unit 2 generates a Delay signal (VLnd, VRnd) by delaying the vertical synchronization signal (VLn, VRn) of the input video signal by the delay of the frame rate conversion unit 1. Note that in this embodiment, the image for left eye and the image for right eye forming a pair are output after being input, and therefore the delay corresponds to two frames of the input video signal.

The frame rate control unit 2 then generates a reference timing signal (Vrn) by partially removing the Delay signal. The reference timing signal is a signal indicating a switch timing of the output image for left eye and image for right eye pair (the image for left eye and image for right eye pair serving as the source of the high frequency image and the low frequency image). For example, when the Delay signal is a 120 Hz signal, a 60 Hz reference timing signal is generated by removing Delay signals existing at timings of every second signal.

The output image control unit 8 generates the output image selection signal using the reference timing signal and the display vertical synchronization signal (Vrna to Vrnc). In this embodiment, the output image selection signal is set at High during a period of two frames (a period between Vr1*a* and Vr1*c*) from a Vr1 timing and at Low during a remaining period (a period between Vr1*c* and Vr2*a*). The output image selection signal is generated repeatedly for each reference timing signal. Thus, a frame of a left eye high frequency image and a frame of a right eye high frequency image generated from the image for left eye and image for right eye pair can be output from the output image selection unit 9 consecutively at each reference timing, and as a result, motion blur can be suppressed.

According to this embodiment, as described above, two (a set of) consecutive frame images constituted by a frame of an image for right eye and a frame of an image for left eye, from among the 2×N frames constituted by frames of respective pairs of images for right eye and images for left eye, are converted into high frequency images and output. Further, the remaining frame images of the 2×N frames are converted into low frequency images and output. As a result, motion blur occurring when two images constituting a stereoscopic video are viewed stereoscopically can be suppressed.

More specifically, in this embodiment, the high frequency image and the low frequency image generated from the image for left eye and image for right eye pair are output in order of the left eye high frequency image, the right eye high frequency image, the left eye low frequency image, and the right eye low frequency image, and as a result, motion blur occurring when two images constituting a stereoscopic video are viewed stereoscopically can be suppressed. Note that similar effects are obtained when the images are output in order of the left eye low frequency image, the right eye low frequency image, the left eye high frequency image, and the right eye high frequency image.

In this embodiment, the input video signal is a video signal in which frames of images for left eye and frames of images for right eye are arranged alternately. However, the format of the input video signal is not limited thereto. For example, in this embodiment, the image for left eye of the pair of images is input first, but the image for right eye may be input first. Further, two video streams including a video stream constituted by images for right eye and a video stream constituted by images for left eye, may be input as the input video signal (a two stream input). In the case of a two stream input, the right eye video stream and the left eye video stream may be written to the memory unit 5, whereupon images for right eye and images for left eye are read from the respective video streams alternately.

In this embodiment, the high frequency image and the low frequency image are generated from the respective frames of the frame rate-converted stereoscopic video, whereupon one of the high frequency image and the low frequency image is selected and output for each frame. However, the present invention is not limited to this constitution, and instead, one of the high frequency image and the low frequency image may be selected and generated for each frame and then output.

Second Embodiment

Next, an image processing apparatus and a control method thereof according to a second embodiment of the present invention will be described. This embodiment is an example of a case in which the frame rate conversion unit 1 triples the frame rate of the input video signal (i.e. a case in which N=3). Note that the constitution of this embodiment may be applied to a case in which the frame rate is converted to a frame rate of a larger multiple than 3.

An apparatus constitution of the second embodiment is identical to that of the first embodiment (FIG. 1), and therefore description thereof has been omitted.

Figure 5:
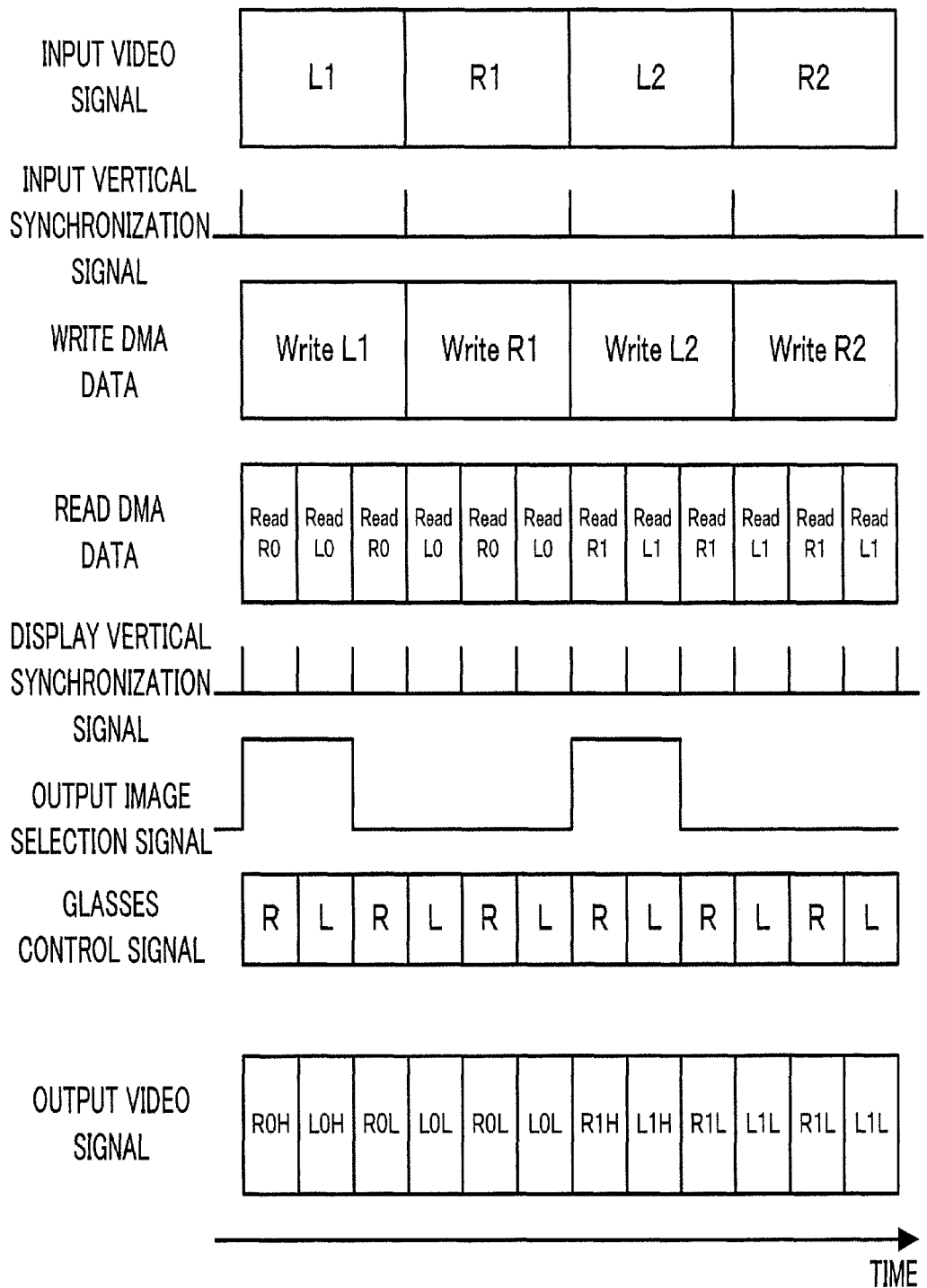
FIG. 5 is a view showing examples of various types of information and output timings thereof according to a second embodiment.

FIG. 5 is a view showing various types of information and output timings thereof according to the second embodiment.

In this embodiment, the vertical synchronization frequency of the input video signal is set at 120 Hz and the vertical synchronization frequency of the video to be displayed is set at 360 Hz.

The output image control unit 8 performs control such that images of two (a set of) consecutive frames constituted by a frame of an image for right eye and a frame of an image for left eye, from among 2×N frames constituted by frames of respective pairs of images for left eye and images for right eye, are converted into high frequency images and output to the display unit 11. The output image control unit 8 also performs control such that the remaining frame images of the 2×N frames are converted into low frequency images and output to the display unit 11.

FIG. 6 is a view illustrating a method of controlling the output of the output image selection unit 9 according to the second embodiment.

Processing up to generation of the reference timing signal is similar to that of the first embodiment, and therefore description has been omitted.

The output image control unit 8 generates the output image selection signal using the reference timing and the display vertical synchronization signal (Vrna to Vrnf). In this embodiment, the output image selection signal is set at High during a period of two frames (the period between Vr1*a* and Vr1*c*) from the Vr1 timing and at Low during a remaining period (the period between Vr1*c* and Vr2*a*).

Note that the output image selection signal generated by the output image control unit 8 is not limited to this output timing as long as the frame of the left eye high frequency image and the frame of the right eye high frequency image generated from the image for left eye and image for right eye pair are output consecutively. In the example shown in FIG. 6, for example, the left eye high frequency image and the right eye high frequency image are output at Vr1*a* and Vr1*b* timings, but the output selection signal may be output such that these images are output at Vr1*c* and Vr1*d* timings. In this case, the output selection signal should be output such that low frequency images are output at Vr1*a*, Vr1*b*, Vr1*e*, and Vr1*f* timings.

FIG. 5 shows an example of a case in which two (a set of) consecutive frame images constituted by a frame of an image for right eye and a frame of an image for left eye, from among the 2☐N frames constituted by frames of respective pairs of images for left eye and images for right eye, are converted into high frequency images and the remaining frame images are converted into low frequency images. However, the present invention is not limited to this example.

In other words, as long as at least one set of consecutive images corresponding to a frame of an image for left eye and a frame of an image for right eye, from among the 2☐N frames constituted by frames of respective pairs of images for left eye and images for right eye, is converted into high frequency images and the remaining frame images are converted into low frequency images, a plurality of sets of consecutive images corresponding to a frame of an image for left eye and a frame of an image for right eye, from among the 2☐N frames constituted by frames of respective pairs of images for left eye and images for right eye, may be converted into high frequency images. More specifically, as shown in FIG. 8, four (two sets of) consecutive frame images corresponding to frames of images for right eye and frames of images for left eye, from among the 2×N frames constituted by frames of respective pairs of images for left eye and images for right eye, may be converted into high frequency images, and the remaining frame images may be converted into low frequency images.

According to this embodiment, as described above, motion blur occurring when two images constituting a stereoscopic video are viewed stereoscopically can be suppressed, similarly to the first embodiment.

Third Embodiment

Next, an image processing apparatus and a control method thereof according to a third embodiment of the present invention will be described. In this embodiment, the frame rate conversion unit 1 (the read DMA unit 4) performs processing for outputting the image for left eye N times in a row and processing for outputting the image for right eye N times in a row in that order.

An apparatus constitution of the third embodiment is identical to that of the first and second embodiments (FIG. 1), and therefore description thereof has been omitted.

FIG. 7 is a view showing various types of information and output timings thereof according to the third embodiment.

Processing up to writing of the input video signal to the memory unit 5 is similar to that of the first and second embodiments, and therefore description has been omitted. In this embodiment, images are read from the memory unit 5 at a delay which is shorter than that of the first and second embodiments by one frame of the input video signal. More specifically, after writing the image for one eye to the memory unit 5, reading of the image for this one eye is begun at an identical timing to writing of the image for the other eye. For example, in a case where an image for left eye L1 is input after an image for right eye R0, the image for right eye R0 is written, whereupon reading of the image for right eye R0 is begun at an identical timing to writing of the image for left eye L1.

The read DMA unit 4 reads and outputs the images recorded in the memory unit 5 in synchronization with the display vertical synchronization signal. In this embodiment, the read DMA unit 4 reads and outputs the images from the memory unit 5 in order of the image for left eye Ln, the image for left eye Ln, the image for right eye Rn, and the image for right eye Rn.

The high frequency image generation unit 6 and the low frequency image generation unit 7 respectively generate high frequency images and low frequency images from the images output by the read DMA unit 4.

The output image control unit 8 generates the output image selection signal and controls the output image selection unit 9 in accordance with this signal. More specifically, the output image control unit 8 performs control such that of 2×N frames constituted by frames of respective pairs of images for left eye and images for image for right eyes of two (a set of) consecutive frames constituted by a frame of an image for right eye and a frame of an image for left eye are converted into high frequency images and output to the display unit 11. The output image control unit 8 also performs control such that the remaining frame images of the 2×N frames are converted into low frequency images and output to the display unit 11.

The output image selection unit 9 selects the image to be output in accordance with the output image selection signal, and outputs the selected image to the display unit 11.

According to this embodiment, as described above, a frame rate-converted stereoscopic video is generated by performing processing for outputting the image for left eye N times in a row and processing for outputting the image for right eye N times in a row in that order. In this case, similarly to the first embodiment, motion blur occurring when two images constituting a stereoscopic video are viewed stereoscopically can be suppressed.

More specifically, in this embodiment, the high frequency images and low frequency images generated from the image for left eye and image for right eye pair are output in order of the left eye low frequency image, the left eye high frequency image, the right eye high frequency image, and the right eye low frequency image. As a result, motion blur occurring when two images constituting a stereoscopic video are viewed stereoscopically can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-105134, filed on Apr. 30, 2010, and Japanese Patent Application No. 2011-007823, filed on Jan. 18, 2011, which are hereby incorporated by reference herein in their entirety.

What is claimed is:

1. An image processing apparatus comprising:
a frame rate conversion unit configured to convert a frame rate of a stereoscopic video constituted by a frame of an image for right eye and a frame of an image for left eye to a three-fold frame rate of the frame rate, and to output each frame three times;
a high frequency image generation unit configured to convert an image of each frame output from the frame rate conversion unit into a high frequency image obtained by cutting or reducing components in a predetermined low frequency band;
a low frequency image generation unit configured to convert the image of each frame output from the frame rate conversion unit into or a low frequency image obtained by cutting or reducing components in a predetermined high frequency band; and an output image selection unit configured to select either a high frequency image generated by the high frequency image generation unit or a low frequency image generated by the low frequency image generation unit, and to output the selected image to a display unit, wherein the output image selection unit switches an image to be output to the display unit such that a first one pair of the image for right eye and the image for left eye, from among three pairs of the image for left eye and the image for right eye output by the frame rate conversion unit, are consecutively displayed using high frequency images, and remaining two pairs are consecutively displayed using low frequency images so as to reduce motion blur.

2. The image processing apparatus according to claim 1, wherein the frame rate conversion unit performs processing for outputting the image for left eye and the image for right eye alternately at the converted frame rate three times.

3. The image processing apparatus according to claim 1, wherein the image for left eye and the image for right eye forming a pair in the stereoscopic video are images captured at an identical timing.

4. A control method for an image processing apparatus, comprising:

converting, by a frame rate conversion unit, a frame rate of a stereoscopic video constituted by a frame of an image for right eye and a frame of an image for left eye into a three-fold frame rate of the frame rate, and outputting each frame three times;

converting, by a high frequency image generation unit, an image of each frame output from the frame rate conversion unit into a high frequency image obtained by cutting or reducing components in a predetermined low frequency band;

converting, by a low frequency image generation unit, the image of each frame output from the frame rate conversion unit into a low frequency image obtained by cutting or reducing components in a predetermined high frequency band; and selecting, by an output image selection unit, either a high frequency image generated by the high frequency image generation unit or a low frequency image generated by the low frequency image generation unit, and outputting the selected image to a display unit, wherein the output image selection unit switches an image to be output to the display unit such that a first one pair of the image for right eye and the image for left eye, from among three pairs of the image for left eye and the image for right eye output by the frame rate conversion unit, are consecutively displayed using high frequency images, and remaining two pairs are consecutively displayed using low frequency images so as to reduce motion blur.

5. The control method according to claim 4, wherein the frame rate conversion unit performs processing for outputting the image for left eye and the image for right eye alternately at the converted frame rate three times.

6. The control method according to claim 4, wherein the image for left eye and the image for right eye forming a pair in the stereoscopic video are images captured at an identical timing.

7. An image processing apparatus comprising:

a frame rate conversion unit configured to input a stereoscopic video constituted by consecutive sets of a frame of an image for right eye and a frame of an image for left eye, to convert a frame rate of each set of the frame of the image for right eye and the frame of the image for left eye to a three-fold frame rate of the frame rate, and to output each frame three times;

a high frequency image generation unit configured to convert an image of each frame output from the frame rate conversion unit into a high frequency image obtained by cutting or reducing components in a predetermined low frequency band;

a low frequency image generation unit configured to convert the image of each frame output from the frame rate conversion unit into or a low frequency image obtained by cutting or reducing components in a predetermined high frequency band; and an output image selection unit configured to select either a high frequency image generated by the high frequency image generation unit or a low frequency image generated by the low frequency image generation unit, and to output the selected image to a display unit, wherein the output image selection unit switches an image to be output to the display unit such that first two pairs of the image for right eye and the image for left eye, from among three pairs of the image for left eye and the image for right eye output by the frame rate conversion unit, are consecutively displayed using high frequency images, and remaining one pair are consecutively displayed using low frequency images so as to reduce motion blur, and wherein the three pairs of the image for left eye and the image for right eye are corresponding to one set of the frame of the image for right eye and the frame of the image for left eye.

8. The image processing apparatus according to claim 7, wherein the frame rate conversion unit performs processing for outputting the image for left eye and the image for right eye alternately at the converted frame rate three times.

9. The image processing apparatus according to claim 7, wherein the image for left eye and the image for right eye forming a pair in the stereoscopic video are images captured at an identical timing.

10. A control method for an image processing apparatus, comprising:

inputting, by a frame rate conversion unit, a stereoscopic video constituted by consecutive sets of a frame of an image for right eye and a frame of an image for left eye;

converting, by a frame rate conversion unit, a frame rate of each set of the frame of the image for right eye and the frame of the image for left eye into a three-fold frame rate of the frame rate, and outputting each frame three times;

converting, by a high frequency image generation unit, an image of each frame output from the frame rate conversion unit into a high frequency image obtained by cutting or reducing components in a predetermined low frequency band;

converting, by a low frequency image generation unit, the image of each frame output from the frame rate conversion unit into a low frequency image obtained by cutting or reducing components in a predetermined high frequency band; and selecting, by an output image selection unit, either a high frequency image generated by the high frequency image generation unit or a low frequency image generated by the low frequency image generation unit, and outputting the selected image to a display unit, wherein the output image selection unit switches an image to be output to the display unit such that first two pairs of the image for right eye and the image for left eye, from among three pairs of the image for left eye and the image for right eye output by the frame rate conversion unit, are consecutively displayed using high frequency images, and remaining one pair are consecutively displayed using low frequency images so as to reduce motion blur, and wherein the three pairs of the image for left eye and the image for right eye are corresponding to one set of the frame of the image for right eye and the frame of the image for left eye.

11. The control method according to claim 10, wherein the frame rate conversion unit performs processing for outputting the image for left eye and the image for right eye alternately at the converted frame rate three times.

12. The control method according to claim 10, wherein the image for left eye and the image for right eye forming a pair in the stereoscopic video are images captured at an identical timing.

* * * * *